No. 763,473. PATENTED JUNE 28, 1904.
J. A. FORNEY.
COFFEE RANGE.
APPLICATION FILED NOV. 19, 1903.
NO MODEL.
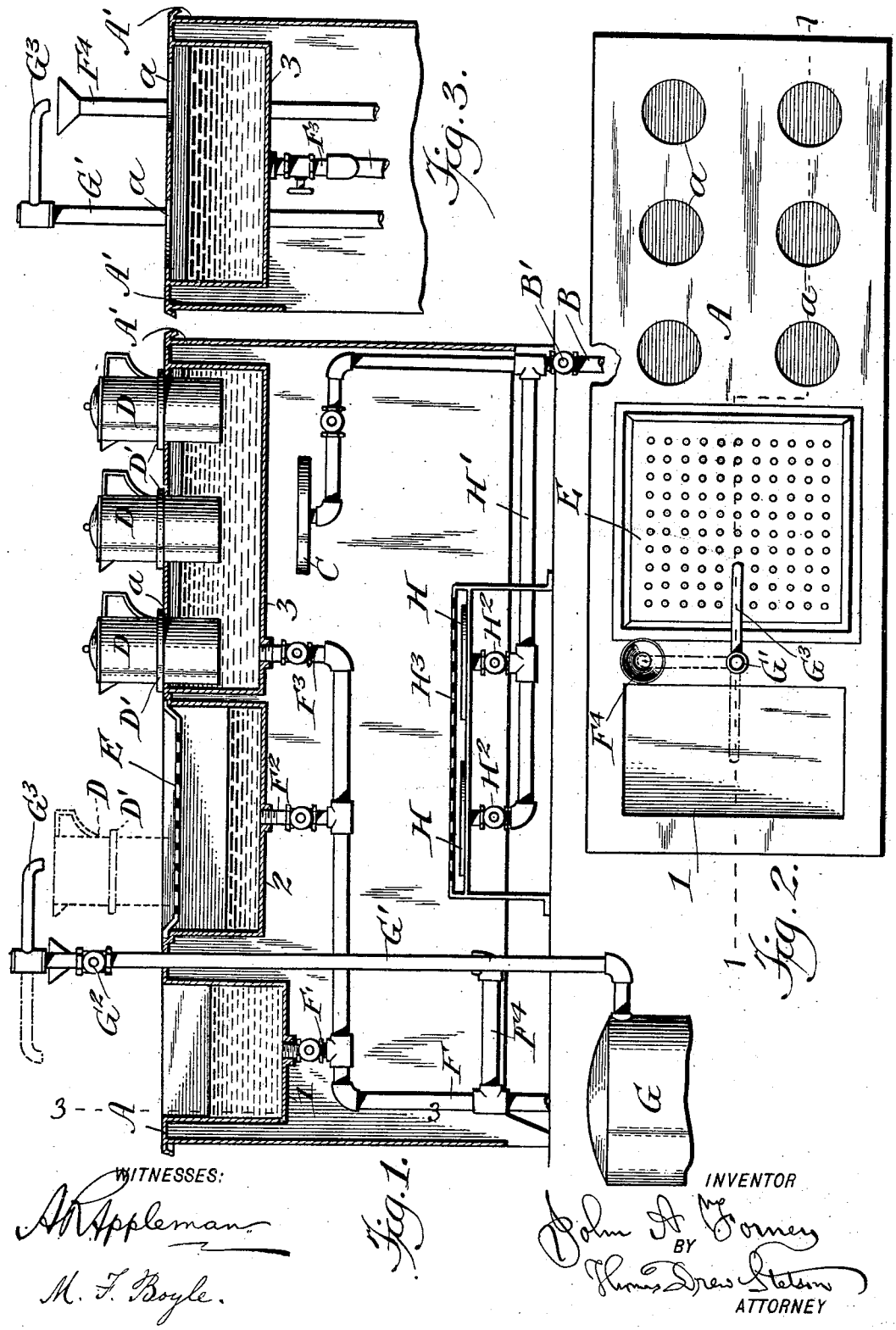

No. 763,473. Patented June 28, 1904.

UNITED STATES PATENT OFFICE.

JOHN A. FORNEY, OF NEW YORK, N. Y.

COFFEE-RANGE.

SPECIFICATION forming part of Letters Patent No. 763,473, dated June 28, 1904.

Application filed November 19, 1903. Serial No. 181,836. (No model.)

*To all whom it may concern:*

Be it known that I, JOHN A. FORNEY, a citizen of the United States, residing in the borough of Manhattan, in the city and State of New York, have invented a certain new and Improved Apparatus for Preparing and Storing Hot Beverages, which I term a "Coffee-Range," of which the following is a specification.

I will describe it as used with coffee, for which it is mainly intended. The apparatus gives great perfection in the decoction and makes it easy to produce and maintain the beverage properly conditioned in the large way for a long period. There are three divisions of the range and three sets of pipes and valves. The apparatus gives facilities for rapid work and also for the slowest and always with the best quality attainable with a given grade of the berry and with little labor or waste.

The following is a description of what I consider the best means of carrying out the invention.

The accompanying drawings form a part of this specification.

Figure 1 is a longitudinal section on the line 1 1 in Fig. 2. Fig. 2 is a plan view with the coffee-pots removed. Fig. 3 is a vertical cross-section on the line 3 3 in Fig. 1.

Similar characters of reference indicate corresponding parts in all the figures where they appear.

A is a top, mainly of sheet metal, and A' sheet-metal sides inclosing the upper portion of the interior.

B is a gas-pipe controlled by a cock B' and supplying gas to a Bunsen burner C, arranged to heat a rectangular tank 3, kept partially filled with water. The top over this tank has circular holes $a$ (shown as six) of suitable size, into which I insert at pleasure large coffee-pots D, having each a flange D', which supports the weight and allows the lower part to be immersed in the water of the tank. In these I make the coffee and pour it out as required. The arrangement makes it easy to steep the coffee for a brief time, preferably in one pot, and pour it into another, in which latter it may be kept hot, separate from the grounds, and without deterioration for any period.

Adjacent to the boiling-tank 3 is a draining-tank 2, having a slightly-sunk perforated top E, which latter is removable for cleaning. Adjacent to this, again, is a dish-washing tank 1. All these tanks are of such dimensions laterally that the hot air and gases from the burner C are confined around them, warming not only the bottoms, but also the four sides of each.

F is a drain-pipe properly trapped, and F' $F^2$ $F^3$ are branches, each controlled by a separate cock for discharging from the several tanks.

$F^4$ is a fourth branch. This extends up above the table at the exactly right distance from the water-pipe G' and is trumpet-formed at the top. This fourth branch may be always open.

G is an ordinary hot-water boiler in the basement supplied from the street-main, and G' a pipe therefrom leading up through my range between the tanks 1 and 2, controlled by a cock $G^2$. It extends up above the top A a little more than the full height of a coffee-pot D D' and carries an arm $G^3$, capable of being revolved, arranged to deliver the moderately-hot water in either of three ways—first, into any one of the coffee-pots D which may be placed adjacent; second, to deliver such water into the washing-tank 1, or, third, it will discharge the water which has cooled by standing in the pipe G'.

It is frequently of great importance to heat a coffee-pot faster than the water-bath will operate. I make a further provision for rapid heating by two additional Bunsen burners H H, supplied with gas through a pipe H', controlled by a cock $H^2$ and covered by a fixed horizontal grate $H^3$. When on opening the place on a cold morning early customers are to be served rapidly, a pot properly charged or a separate vessel with water is placed on the grating $H^3$ and subject to the direct heat of the strong flame. After the pressing demand has been satisfied the burner H may be put out of use.

It will now be understood that to make coffee the arm $G^3$ is turned to waste a little of the first water through the funnel $F^4$ and a proper quantity of ground coffee is placed in a pot D and brought into position resting on the top E. Then the arm $G^3$ is turned and the pot filled, and the pot being then set in one of the holes $a$ it absorbs further heat from the boiling water in tank 3 and the coffee is ready. If all is not immediately used, the pot is allowed to stand a brief period on the top E again, and so much of the grounds will sink that the main portion may be poured with a little care into another pot containing no grounds and kept near the boiling-point for any period always ready for immediate use.

The half-spent heat from the burner C, which is always burning moderately, and also of the burner H, which may be of any required power at intervals—all that portion of the heat from each which is not absorbed by the cooler surface immediately over it—is prevented from heating the apartment and is utilized by my range to maintain a moderately-high temperature in the tanks 1 and 2. After the dishes have been washed in the tank 1 they may be inverted on the perforated top E and drained. All the tanks can be emptied either at intervals or continuously by properly opening the cocks in the branches $F'$ $F^2$ $F^3$.

I have tested the range in the large way and can make coffee in any quantity from one cup up to six gallons in ten minutes with all the perfection of the most approved apparatus and can conveniently hold it for hours without appreciable deterioration at a high temperature ready for immediate use.

Modifications may be made without departing from the principle or sacrificing the advantages of the invention.

The depths and areas of the several tanks and the number of the coffee-pots and the number of holes $a$ therefor may be varied within wide limits.

I claim as my invention—

1. In a coffee apparatus a drain-tank provided with a removable perforated cover, with a washing-tank on one side and a heating-tank on the other side thereof, in combination with each other and with a pipe for bringing gas to effect the heating, another for bringing water to conveniently supply the washing-tank, and another for draining, and with provisions for controlling all at will, all substantially as herein specified.

2. In a coffee apparatus a drain-tank provided with a removable perforated cover with a washing-tank on one side and a heating-tank on the other side thereof, in combination with a pipe for bringing gas, another for bringing water and another for draining, with provisions for controlling all at will, arranged to apply the combustion of the gas directly to the heating-tank and with an inclosing-casing arranged to retain the hot products of combustion and utilize their remaining heat on the other tanks, all substantially as herein specified.

3. In a coffee apparatus a drain-tank provided with a removable perforated cover, with a washing-tank on one side and a heating-tank on the other side thereof, in combination with each other and with a pipe for bringing gas, another for bringing water and another for draining, and with provisions for controlling all at will, the water-supply pipe being arranged between the first-named tanks and equipped to deliver into either of said tanks, or the waste-pipe, and to cut off the flow of water therethrough, as required, all substantially as herein specified.

In testimony that I claim the invention above set forth I affix my signature in presence of two witnesses.

JOHN A. FORNEY.

Witnesses:
S. H. STODDER,
M. F. BOYLE.